(No Model.)  9 Sheets—Sheet 1.

R. A. PRESTON.
CULTIVATING AND SEEDING MACHINE.

No. 341,108. Patented May 4, 1886.

WITNESSES:
Norris A. Clark
C. P. Bailey.

INVENTOR
Russell A. Preston,
by Soulé and Co.
Attys.

(No Model.) 9 Sheets—Sheet 2.

R. A. PRESTON.
CULTIVATING AND SEEDING MACHINE.

No. 341,108. Patented May 4, 1886.

WITNESSES:
Norris A. Clark.
G. P. Bailey

INVENTOR:
Russell A. Preston,
by Soulé and Co.
attys.

(No Model.) 9 Sheets—Sheet 4.
R. A. PRESTON.
CULTIVATING AND SEEDING MACHINE.

No. 341,108. Patented May 4, 1886.

WITNESSES:
Norris A. Clark
C. P. Bailey.

INVENTOR:
Russell A. Preston,
by Soulé and Co.
attys.

(No Model.) 9 Sheets—Sheet 5.
R. A. PRESTON.
CULTIVATING AND SEEDING MACHINE.

No. 341,108. Patented May 4, 1886.

Fig. 5.

WITNESSES:
Norris A. Clark.
G. P. Bailey

INVENTOR:
Russell A. Preston
by Soulé and Geo.
attys.

(No Model.) 9 Sheets—Sheet 6.

R. A. PRESTON.
CULTIVATING AND SEEDING MACHINE.

No. 341,108. Patented May 4, 1886.

WITNESSES
Norris A. Clark.
C. P. Bailey,

INVENTOR
Russell A. Preston
by Soulé and Co.
Attys (No Model.) 9 Sheets—Sheet 8.

R. A. PRESTON.
CULTIVATING AND SEEDING MACHINE.

No. 341,108. Patented May 4, 1886.

WITNESSES:
Norris A. Clark
C. P. Bailey.

INVENTOR:
Russell A. Preston
by Soulé and Co.
Attys.

N. PETERS, Photo-Lithographer, Washington, D. C.

(No Model.) 9 Sheets—Sheet 9.
R. A. PRESTON.
CULTIVATING AND SEEDING MACHINE.
No. 341,108. Patented May 4, 1886.

WITNESSES:
Norris A. Clark
C. P. Bailey,

INVENTOR:
Russell A. Preston
by Soulé and Co.
Attys.

UNITED STATES PATENT OFFICE.

RUSSELL A. PRESTON, OF SWAN, INDIANA.

CULTIVATING AND SEEDING MACHINE.

SPECIFICATION forming part of Letters Patent No. 341,108, dated May 4, 1886.

Application filed July 27, 1885. Serial No. 172,800. (No model.)

*To all whom it may concern:*

Be it known that I, RUSSELL A. PRESTON, a citizen of the United States, residing at Swan, in the county of Noble and State of Indiana, have invented certain new and useful Improvements in Cultivating and Seeding Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

In the accompanying drawings, Fig. 3 is a bottom view.

Like letters designate corresponding parts in all of the figures.

Figures 6, 7, 8, 9:
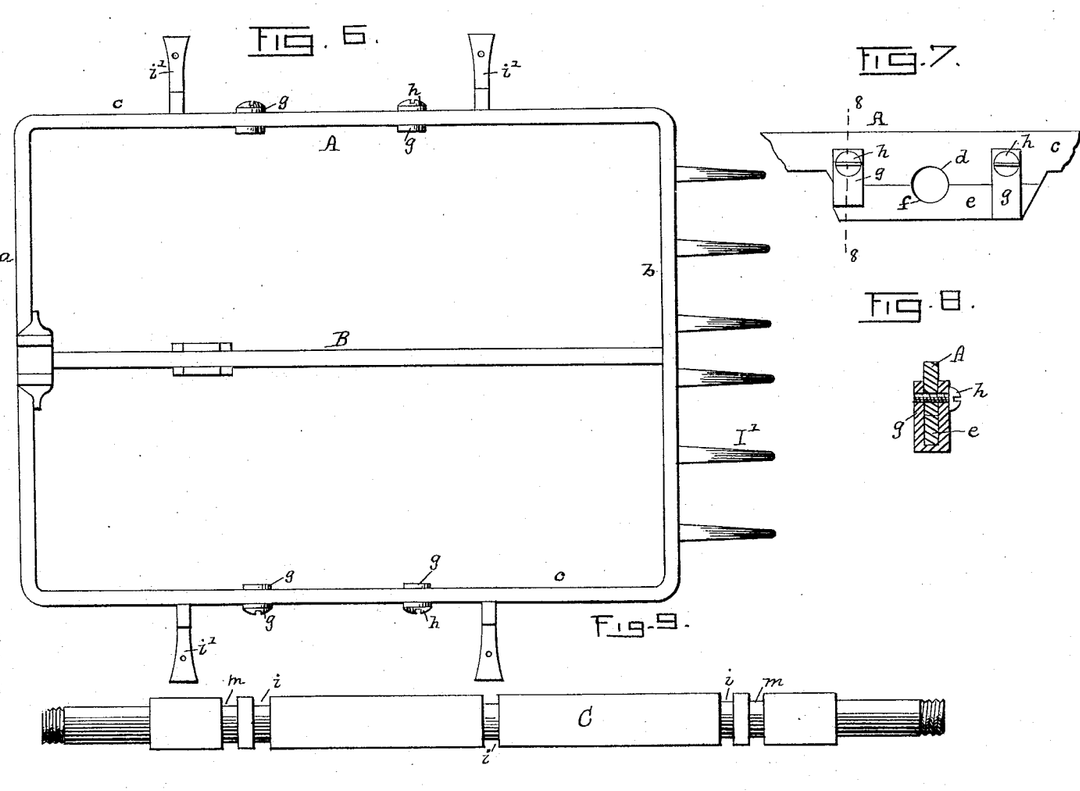
Fig. 6 is a detached plan view of the main frame.
Fig. 7 is a side view of the central portion thereof.
Fig. 8 is a vertical cross-section in a plane indicated by the line 8 8 in Fig. 7.
Fig. 9 is a detached view of the main axle.

The main frame A of the machine is a rectangular metallic frame having front band, *a*, back band, *b*, and side bands, *c c*. The frame is braced by means of a metallic tie-bar, B, which connects the center of the front and back of the frame.

The main axle C of the machine is mounted on the main frame. The sides *c c* of the frame rest upon the axle and form bearings for the same. The axle is supported beneath by metallic blocks *e*, which may be curved on their upper sides at *f* to form bearings for the axle. These blocks *e* are removably secured to the main frame by links *g g*, riveted to the blocks, and secured to the main frame by bolts *h*. The axle, which is rectangular in cross-section, is recessed, and circular in sections at the points *i i*, where it supports the main frame, and where the central brace-bar, B, crosses it, whereby endwise thrust of the same is prevented. Rigidly secured to the axle are the drive-wheels D D.

Figure 4:
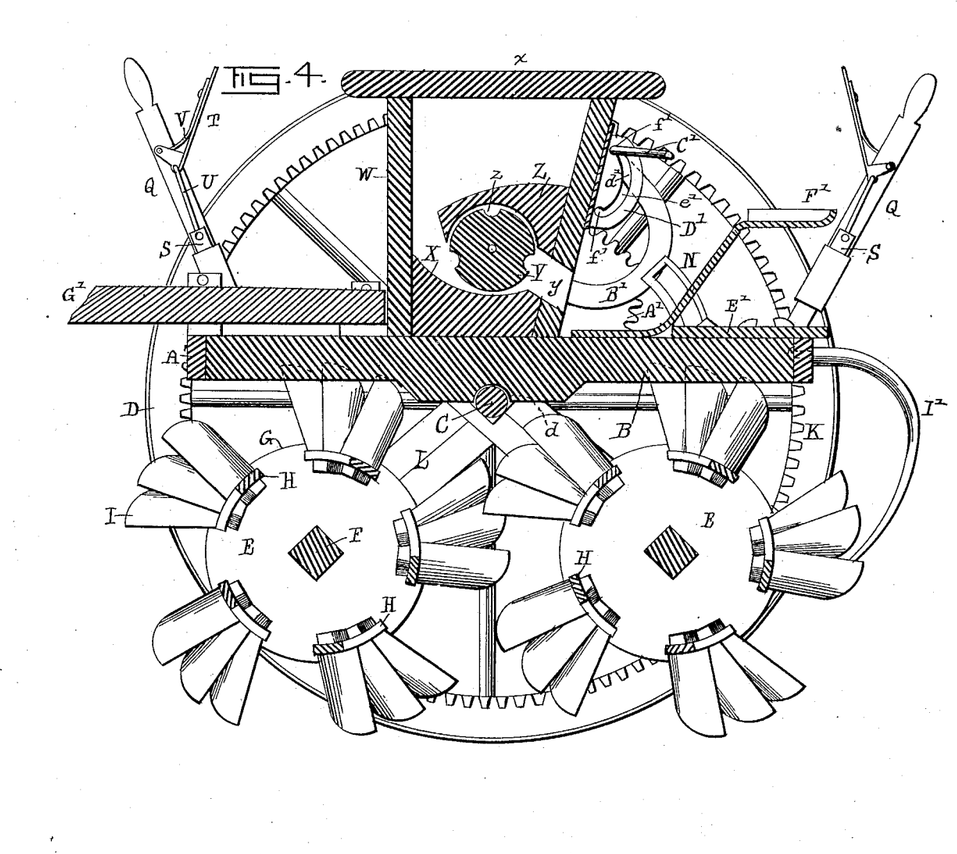
Fig. 4, a central vertical longitudinal section, and Fig. 5 a rear view of the machine complete.

E E are the rotary cylindrical cultivators. Each of these rotary cultivators has a shaft, F, upon which are rigidly secured two wheels or disks, G G. Connecting these disks near the peripheries thereof are cross-bars H H, diagonally arranged—that is, not parallel with the shaft F. Upon these bars are mounted the cultivator-teeth I I. The machine is provided with two of these rotary cultivators, E E, which are rotatively mounted beneath the main frame forward and back of the axle, so as to counterbalance each other. Each cultivator is rotated by means of a pinion, J, secured to its shaft, which meshes with an internal gear, K, on the drive-wheels D. To secure steadiness of motion and rotation in the same direction, one cultivator is rotated from one drive-wheel and the other from the other.

An important feature of this invention is the mechanism whereby the cultivators are adjusted in height from the ground, so that the ground may be cultivated to any desired depth.

Figures 10, 11, 12, 13, 14:
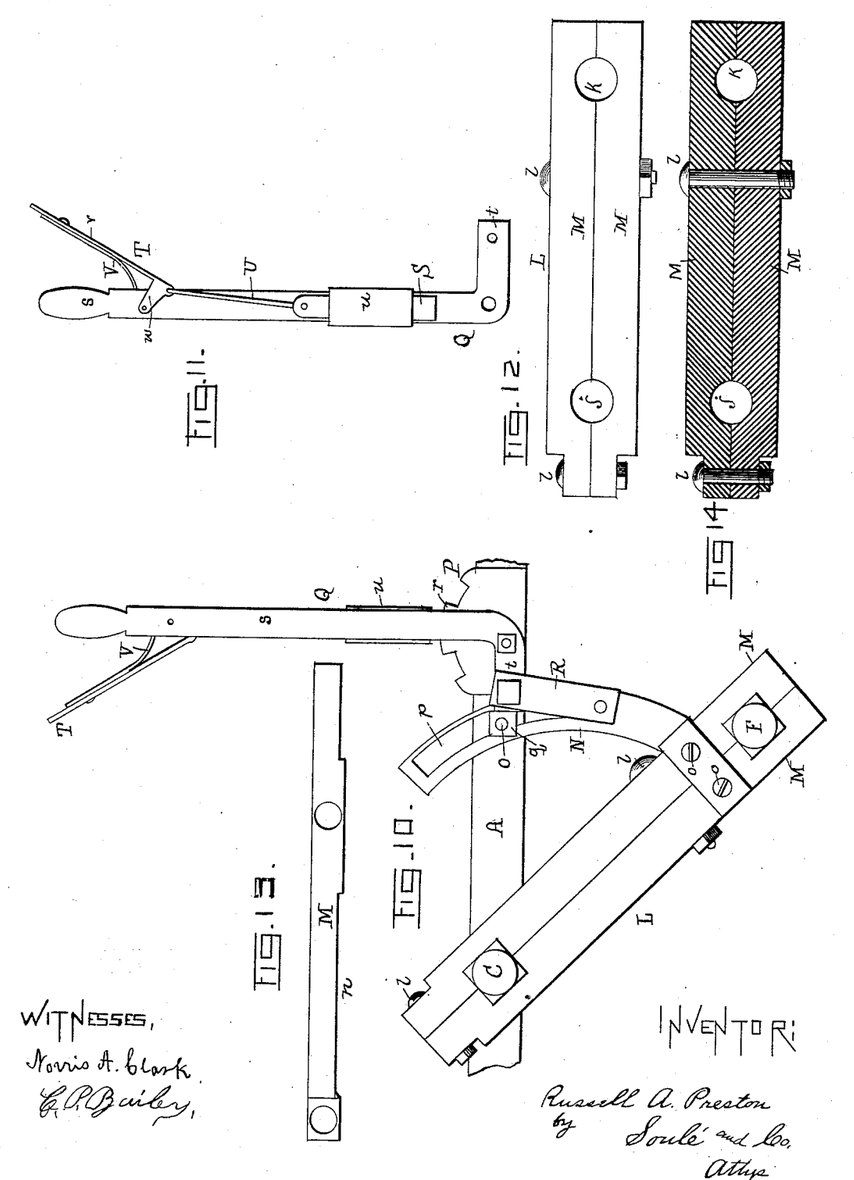
Fig. 10 is a detached view of the cultivator adjusting mechanism.
Fig. 11 is a side view of the cultivator operating-lever.
Fig. 12 is a side view of one of the cultivator supporting-frames.
Fig. 13 is a top view of the same.
Fig. 14 is a central longitudinal section of the same.

The shaft F of each cultivator is mounted at each end in a supporting-frame, L, which is pivotally suspended from the axle C. This supporting-frame is composed of two separate metallic bars, M M, which fit flat against each other, are cut away to form semicircular recesses at *j j* to embrace the axle, and at *k k* to form a bearing for the cultivator-shaft. After being placed in position on the axle C and shaft F the bars M M are bolted rigidly together by bolts *l l*. At the points *m*, where these frames L L embrace the axle C, the axle is reduced to a circular shape, to permit the oscillation of the supporting-frames, and to prevent their endwise displacement. At the same place on the axle two of these supporting-frames, for the rear and forward cultivators, are hung, and to accommodate them and economize space the bars M M are reduced in width, as shown at $n$. It will thus be seen that these supporting-frames, while offering supports for the cultivator-shafts, permit them to be swung up and down in circular arcs, which have the axle of the machine for their center, and are thus concentric with the drive-wheels. This circular movement is important, since by this means only can the cultivator be vertically adjusted and still be driven directly from the drive-wheels.

Figure 15:
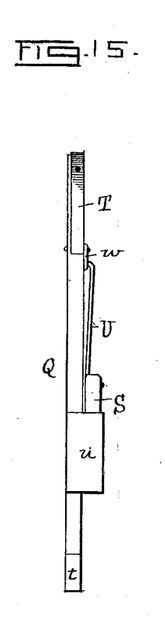
Fig. 15 is a front view of the lever shown in Fig. 11.

The lower or free end of each supporting-frame L is supported by a curved supporting-bar, N, which is concentric with the main axle of the machine. This bar is rigidly secured to the frame L by bolts $o$ $o$. The upper portion of the bar N is formed with a longitudinal slot, $p$, the length of this slot determining the extent of the vertical adjustment of the rotary cultivators. This slot embraces a bolt, O, on the main frame A, a nut, $q$, retaining the bar in position laterally. Secured to the main frame, outside of each bolt O, is a semicircular rack, P, having rack-teeth $r$. An angular lever, Q, is pivoted to the center of this rack at its angle, the longer arm, $s$, of which extends upward to form the operating-handle, the lower arm, $t$, extending backward toward the curved bar N. Connecting the arm $t$ of the angular lever with the bar N is a link, R, which is pivoted at its opposite ends to said arm and bar. On the inner side of the long arm, $s$, of the angular lever is formed a long hollow box, $u$, which serves as a guide or way for a dog, S, which slides in said way and engages the rack P. A small angular lever, T, having long arm, $v$, and short arm, $w$, is pivoted at the end of its short arm to the long arm, $s$, of the lever Q. This lever T is so located on the lever Q that their respective handle ends shall be close together, so that the attendant of the machine can operate them simultaneously with the same hand. One end of a link-rod, U, is pivoted to the lever T at the angle thereof, and the other end of said rod is pivoted to the upper end of the dog S. A spring, V, secured at one end to the lever T, is interposed between the levers T and Q. This spring normally holds the lever T away from the lever Q, and so exerts a downward pressure on the dog S, thus keeping said dog engaged with the rack P.

When it is desired to raise or lower the rotary cultivators, each lever Q is operated as follows: The long arm $v$ of the small lever is pressed toward the long arm $s$ of the lever Q, thus disengaging the dog S from the rack P. The lever Q can then be turned on its pivot, and, being connected to the cultivator-shaft F through link R, movable bar N, and pivoted frame L, its movement raises or lowers the cultivator-shafts, as the case may be. When the cultivators have been thus brought to the desired position, the lever T is released, and the spring V presses the dog S into engagement with the rack P, thus holding the parts firmly in the desired position.

Figure 16:
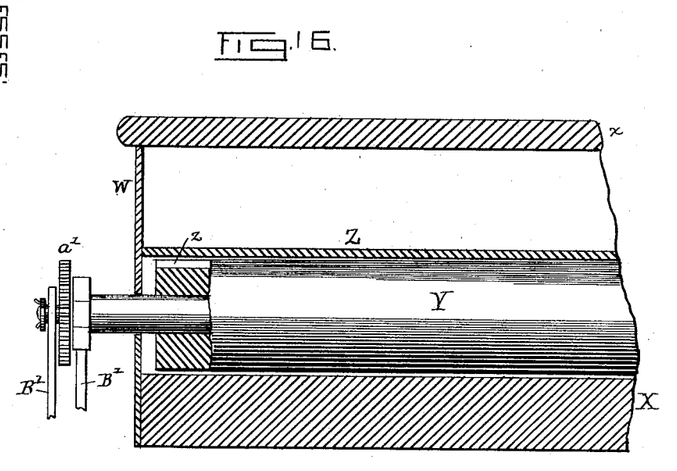
Fig. 16 is a central vertical cross-section of a portion of the seeding-box.
Figure 17:
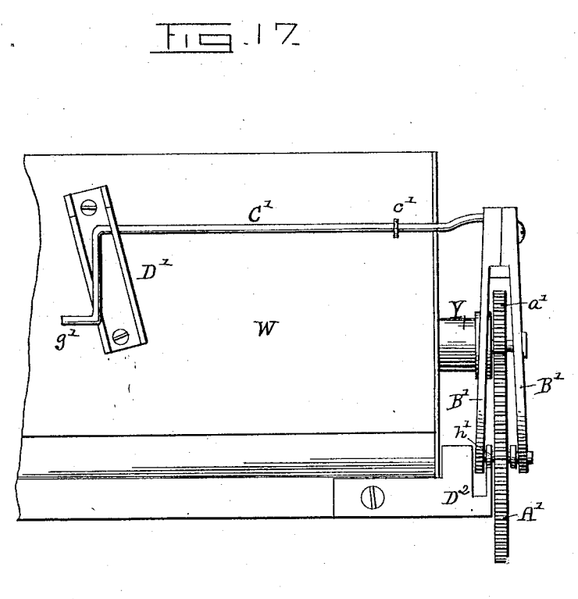
Fig. 17 is a rear view of the same.

Mounted centrally on the main frame A, directly above the axle, is the seeding mechanism. This seeding mechanism constitutes a broadcast seeder, and hence the seed-box W extends the entire width of the main frame A. This box has close sides, front, and back, and a hinged cover, $x$, of ordinary construction. The bottom X is curved or concave on its upper side, and has a downwardly-inclined longitudinal discharge slit or opening, $y$, in the rear. In the box W is a rotating seeding-shaft, Y, which is mounted lengthwise of the box and parallel with the axle C. This shaft Y is mounted close to the bottom X, nearly touching the same, and is provided with longitudinal seeding-grooves $z$ $z$. Fixed within the box above shaft Y, and covering the discharge-opening $y$, is a forwardly-inclined shield, Z. The seed to be planted is placed in the box W above the shield Z, and it falls to the bottom forward of the shaft Y. As the shaft rotates in the direction indicated, the seed lodges in the grooves $z$, in which it is carried to the rear of the box, and is discharged through opening $y$. From opening $y$ the seed falls to the ground, which has already been cultivated by the forward cultivator, and it is covered by the rear cultivator. The shaft Y extends out beyond one side of the seeding-box, and is there provided with a pinion, $a'$. This pinion engages with a gear-wheel, A', which in turn engages with a pinion, $b'$, fixed to the main axle C. This intermediate gear-wheel is necessary to rotate the shaft Y in the proper direction. When it is not desired to sow seed, the wheel A' can be disengaged from the pinion $b'$. The wheel A' is mounted in a frame composed of two curved bars, B' B', which are pivotally hung at one end to the shaft Y, so that they may be turned without disengaging the wheel A' and pinion $a'$. At their upper ends the two bars B' B' are bolted together and attached to one end of a lever, C'. This lever is pivoted at $c'$ to the rear of the seeding-box W. The free end of this lever extends into a slot, $d'$, in a plate, D', secured to the seeding-box. This slot has a vertical branch, $e'$, and two holding-notches, $f'$ $f'$, at either end, which catch and hold the end of the lever C'. When the lever is held in the upper notch, $f'$, the other end of the lever where it is secured to the bars B' B' is necessarily at its lowest position, and the parts are so relatively arranged that at this time the gear-wheel A' meshes with pinion $b'$. When it is desired to disengage wheel A', the lever is lifted out of the upper notch and depressed until it is held in the lower notch. This downward movement lifts the outer end of the lever, and with it bars B' and wheel A', the movement being sufficient to disengage pinion $b'$ and wheel A'. The free end of the lever C' is provided with a handle, $g'$, for its ready manipulation.

To insure the retention of the parts in their proper positions, the inner bar B' moves in a slotted guide-plate, $D^2$, secured to the seed-box. To allow room for this bar to work in this slotted plate, a washer, $h'$, is interposed between it and the gear-wheel $A'$.

Figure 1:
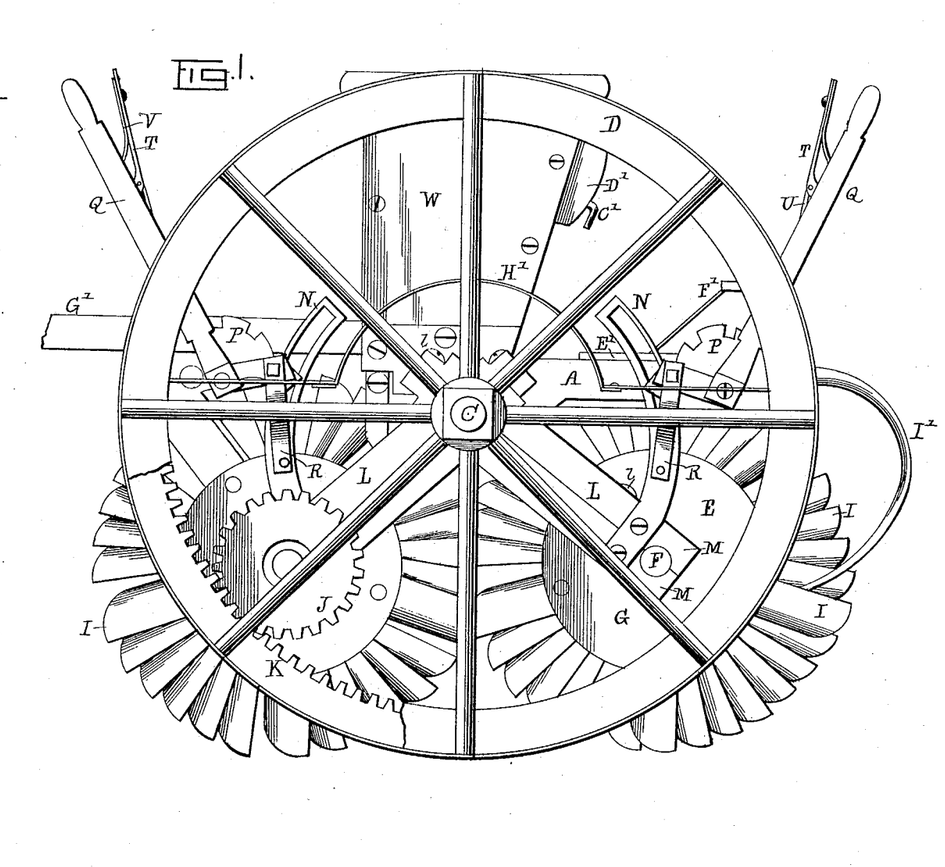
Figure 1 is a view of one side of the machine.
Figure 2:
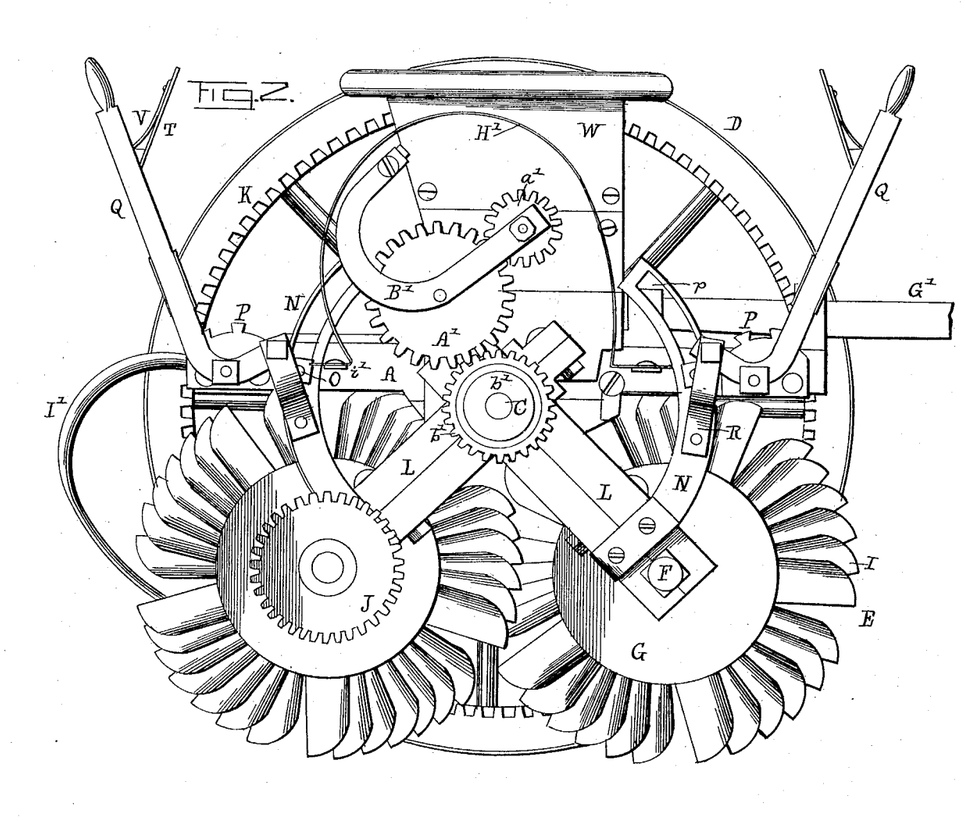
Fig. 2 is a view of the opposite side of the machine, the wheel being removed.
Figure 5:
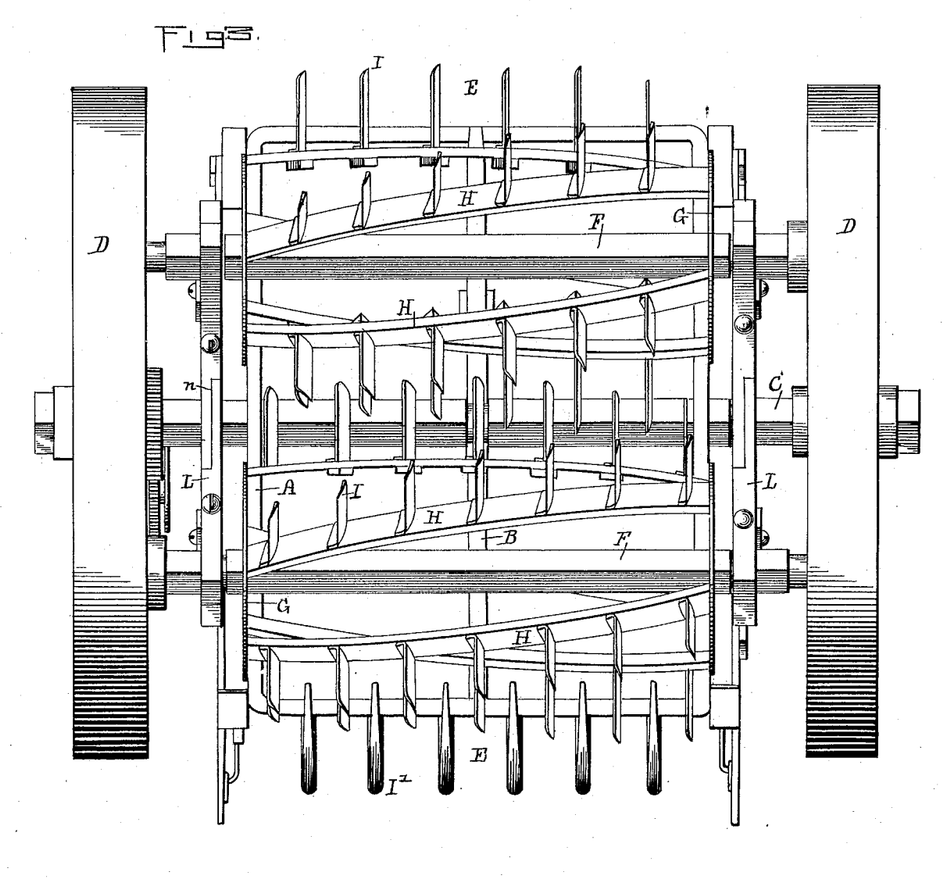

This machine is provided with a rear platform, $E'$, and with a driver's seat, $F'$, back of the platform. The seat is supported by the cross-bar B. The machine is shown as provided with a draft-pole, $G'$, and is adapted to be drawn by two horses. The gearing is protected by arched aprons $H'$, which are secured to brackets $i'$ $i'$, attached to the main frame.

Figure 18:
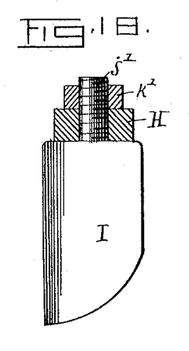
Fig. 18 is a detached view of one of the cultivator-teeth.
Figure 19:
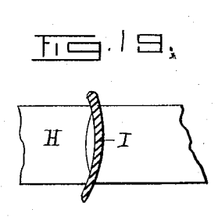
Fig. 19 is a cross-section of the same.

The teeth I I of the rear cultivator intermesh with those of the front cultivator, and thus clear the former of any weeds, &c., that may collect between them. To clear the teeth of the rear cultivator, downwardly-curving teeth $I'$ $I'$ are attached to the rear of the main frame, their free ends intermeshing with the teeth of the rotary cultivator. Each cultivator-tooth is provided with a screw-threaded shank, $j'$, which extends through an aperture in the tooth-bar H, and the tooth is secured to said bar by a nut, $k'$. Each tooth has a sharp cutting-edge on the side which enters the soil. Each tooth is also slightly curved in cross-section, partaking slightly of the shape of a plow. This enables it to turn the soil better, and so the better to cover the seeds. The tooth-bars H H, as previously stated, are not parallel with the shaft F, but are arranged at an angle thereto. They are preferably so arranged that if there are five bars H H to to each cultivator-cylinder, each in its length between the disks G G extends through one-fifth of the circumference of the entire cylinder. The effect of this arrangement is that part of the cultivator-teeth are always in the earth, and they cut into the earth one by one in constant succession, and thus the strain upon the draft-animals is always the same.

I claim as my invention—

1. The main frame, axle, and drive-wheels of a cultivating and seeding machine, said drive-wheels being provided with internal gear, a seed-box centrally located on said main frame, seeding mechanism within said box, and gearing connecting said seeding mechanism with said main axle, whereby said mechanism is automatically operated, in combination with vertically-adjustable rotary cultivators, carried by said main frame beneath the same before and behind the seed-box, and pinions, carried by the shafts of said rotary cultivators, which at all times gear with said drive-wheels, substantially as set forth.

2. The main frame, axle, and drive-wheels of a cultivating-machine, said drive-wheels being provided with internal gear, in combination with two sets of supporting-frames pivotally and angularly suspended from the axle, said sets of frames being inclined from the axle in opposite directions, vertically-adjustable supporting-bars connecting said supporting-frames with the main frame, and rotary cultivator-shafts mounted in said supporting-frames, said cultivator-shafts carrying pinions which mesh with the internal gear on the drive-wheels, substantially as set forth.

3. The main frame, axle, and drive-wheels of a cultivating-machine, each of said drive-wheels being provided with internal gear, in combination with two sets of supporting-frames pivotally and angularly suspended from the axle, said sets of frames being inclined from the axle in opposite directions, vertically-adjustable bars rigidly secured to said supporting-frames and adjustably connected with said main frame, said bars being curved and concentric with the drive-wheels, and rotary cultivator-shafts mounted in said supporting-frames, each of said shafts being provided with a single pinion, one of said pinions meshing with the internal gear on one of said drive-wheels, and the other pinion meshing with the gear on the other drive-wheel, substantially as set forth.

4. The main frame, axle, and drive-wheels of a cultivating-machine, supporting-frames pivotally suspended from said axle, and rotary cultivators mounted in said supporting-frames and driven by direct engagement with said drive-wheels, in combination with bolts on said main frame, vertically-adjustable supporting-bars rigidly secured to said supporting-frames, which bars are provided with curved slots concentric with the drive-wheels, which slots embrace said bolts and limit the extent of the movement of said supporting-frames, substantially as set forth.

5. The main frame, axle, and drive-wheels of a cultivating-machine, supporting-frames pivotally suspended from said axle, and rotary cultivators mounted in said supporting-frames and driven from the drive-wheels, in combination with bolts secured to the main frame, curved bars concentric with the main drive-wheels, rigidly secured to the supporting-frames, and provided with slots which embrace said bolts, angular operating-levers pivoted at their angles to the main frame, and links pivoted at opposite ends to the short arms of said levers and to the curved connecting-bars, substantially as set forth.

6. The main axle of a cultivating-machine and the shaft of a rotary cultivator, in combination with a supporting-frame which connects said main axle and cultivator-shaft, said frame being composed of two separate similar longitudinal bars, M M, bolted together, each of said bars being formed with two semicircular recesses, which, together with corresponding recesses on the other bar, embrace and form bearings for said axle and shaft, substantially as set forth.

7. A seed-box, a rotary seed-shaft mounted therein, a pinion on said shaft, a frame pivotally suspended from said shaft, and a gear-wheel mounted in said frame, which meshes with said pinion, in combination with a plate, $D'$, secured to said seed-box and provided with a slot, $e'$, having holding-notches $f'$ $f'$, and a lever pivoted to the seed-box and secured at one end to said pivotally-suspended frame, the free end of which lever moves in said slot $e'$ and is retained in said notches $f'' f''$, substantially as set forth.

8. A seed-box having a downwardly-inclining continuous discharge-opening, $y$, extending along its entire side at the bottom thereof, in combination with a rotary seed-shaft, Y, mounted in said box near the bottom thereof, said shaft having longitudinal grooves $z\ z$ in its periphery extending along its entire length within the seed-box, and an inclined shield, Z, secured to one side of said box and extending partly across the same, which covers said discharge-opening and said seed-shaft, substantially as set forth.

In testimony whereof I affix my signature in presence of two witnesses.

RUSSELL A. PRESTON.

Witnesses:
 CALEB A. BRANCH,
 LEWIS COVELL.